United States Patent
Bonduelle et al.

(10) Patent No.: US 12,376,577 B2
(45) Date of Patent: Aug. 5, 2025

(54) DEVICE AND SYSTEM FOR MONITORING THE RISK OF PEST INFESTATION IN A GRAIN STORAGE ENVIRONMENT

(71) Applicant: JAVELOT, Wasquehal (FR)

(72) Inventors: Félix Bonduelle, Wasquehal (FR); Justin Vion, Vaudricourt (FR); Charles Perrard, Paris (FR); Marine Cabacos, Etampes (FR); Katell Crepon, Versailles (FR); Alexis Bernazeau, Villeneuve d'Ascq (FR); Benoit Poulain, Lille (FR); Loic Lawniczak, Oignies (FR); Thomas Grandjean, Tourcoing (FR)

(73) Assignee: JAVELOT, Wasquehal (FR)

( * ) Notice: Subject to any disclaimer, the term of this patent is extended or adjusted under 35 U.S.C. 154(b) by 84 days.

(21) Appl. No.: 18/044,631

(22) PCT Filed: Sep. 3, 2021

(86) PCT No.: PCT/EP2021/074402
§ 371 (c)(1),
(2) Date: Mar. 9, 2023

(87) PCT Pub. No.: WO2022/053408
PCT Pub. Date: Mar. 17, 2022

(65) Prior Publication Data
US 2023/0309536 A1    Oct. 5, 2023

(30) Foreign Application Priority Data

Sep. 9, 2020 (FR) ..................................... 2009113

(51) Int. Cl.
*A01M 1/02*  (2006.01)
*A01M 1/10*  (2006.01)

(52) U.S. Cl.
CPC ............ *A01M 1/026* (2013.01); *A01M 1/103* (2013.01)

(58) Field of Classification Search
CPC ...................................................... A01M 1/026
See application file for complete search history.

(56) References Cited

U.S. PATENT DOCUMENTS 5,473,942 A * 12/1995 Vick ...................... G01V 1/001
                                                  367/136
5,594,654 A *  1/1997 Shuman .................. G01V 8/12
                                                  702/128

(Continued)

FOREIGN PATENT DOCUMENTS

CN          107347859 A         11/2017

OTHER PUBLICATIONS

International Search Report from International Application No. PCT/EP2021/074402 dated Oct. 26, 2021, 3 pgs.

*Primary Examiner* — Michael H Wang
(74) *Attorney, Agent, or Firm* — Tutunjian & Bitetto, P.C.

(57) ABSTRACT

The present invention relates to a pest trap device in a cereal storage environment including a long hollow body having a medial portion having a plurality of openings and a lower portion. The medial portion and the lower portion are connected by a non-return opening system. The pest trap device includes an on-board electronic module having at least one sensor configured to generate at least one risk data item containing at least one item of representative information of an infestation risk in the trapping zone. Wireless transmission means are configured to transmit the at least one risk data item to an offset electronic entity.

19 Claims, 3 Drawing Sheets

(56) References Cited

U.S. PATENT DOCUMENTS

| | | | | |
|---|---|---|---|---|
| 5,646,404 | A * | 7/1997 | Litzkow | A01M 1/026 250/358.1 |
| 6,304,185 | B1 * | 10/2001 | Tuttle | A01M 1/026 43/132.1 |
| 6,707,384 | B1 * | 3/2004 | Shuman | G01N 15/1456 340/573.2 |
| 7,509,770 | B2 * | 3/2009 | Gardner, Jr. | A01M 31/002 43/107 |
| 8,896,451 | B2 * | 11/2014 | Oppenheimer | A01M 1/12 340/573.2 |
| 11,039,607 | B2 * | 6/2021 | Pinheiro Pinto Sobreiro | A01M 1/106 |
| 2013/0250116 | A1 * | 9/2013 | Oppenheimer | H04Q 9/00 348/152 |
| 2018/0263232 | A1 * | 9/2018 | Azzarello | A01M 1/026 |

* cited by examiner

DEVICE AND SYSTEM FOR MONITORING THE RISK OF PEST INFESTATION IN A GRAIN STORAGE ENVIRONMENT

TECHNICAL FIELD

The present invention relates to the field of pest control.

The present invention relates more specifically to a device and a system for monitoring an infestation risk making it possible to identify pest proliferation factors in a cereal storage environment.

Infestation risk according to the present invention denotes throughout the following description any element for characterising the presence, species, number and/or favourable conditions for the establishment and/or growth of a population of insect pests, particularly of weevils.

The present invention will thus find numerous advantageous applications in the field of food safety, and particularly in the remote and long-term monitoring of cereal silos.

PRIOR ART

The Applicant observes that the long-term storage of cereals, particularly of grains or rice, represents a pest infiltration risk, particularly of weevil type insect pests, which breed in the cereal.

Therefore, monitoring of stored cereals is essential to preserve stocks and to prevent pest proliferation.

To detect insect pests, it is already known to use a variety of insect traps in or around stocks. Such traps alone do not make it possible to protect a stock of cereals, but provide personnel with a visual indicator of the presence of insects inciting the use of pest control solutions, particularly via storage pesticides.

This use of storage pesticides makes it possible to get rid of the majority of pests on an ad hoc basis, but excessive use thereof represents a health risk, increased environmental toxicity and leads to the appearance of more resistant pest species.

The insect trap solutions currently proposed are therefore limited to providing an indicator of the presence of insects, which must be noted manually by personnel on-site. The personnel present on cereal storage sites are themselves limited, particularly for economic reasons resulting from reduced storage margins.

Therefore, the Applicant proposes that there is to date no satisfactory alternative solution for the remote monitoring of an infestation risk making it possible to minimise the personnel, pesticides and resources used to prevent pest proliferation in a cereal silo.

SUMMARY OF THE INVENTION

The present invention is intended to improve the current situation described above. The present invention is aimed more specifically at remedying the above drawbacks by proposing a solution capable of detecting parameters associated with an infestation risk and transmitting them to incite a suitable reaction.

To this end, the present invention relates in a first aspect to a device for trapping insects in a cereal storage environment including a slender hollow body having a medial portion comprising a plurality of openings opening into an internal volume of the medial portion defining an insect capture zone and a lower portion wherein the internal volume defines an insect trapping zone, the medial portion and the lower portion being connected by a non-return opening system. The present invention consists of an actual trap capable of trapping insects in a cereal storage environment.

Thus, it is possible to position the trap in a cereal storage environment. Once positioned, the hollow body, for example of cylindrical shape, is designed such that the insects enter the capture zone through one of the openings of the medial portion, then enter the trapping zone via the non-return system, which blocks or curbs their exit from the trapping zone. The insects can be attracted into the capture zone and/or into the trapping zone by a plurality of means known to a person skilled in the art, for example by using pheromones or other composition disposed in the trapping zone and attracting the insects and/or by a gravitational trapping system wherein the hollow body extends along a substantially vertical direction, the trapping zone being disposed under the capture zone and the insect being caused to fall in or towards the trapping zone.

The openings have for example a round shape of a diameter between 2 mm and 5 mm, preferably 2.5 mm or an oval shape of dimensions substantially equal to 4 mm by 2 mm.

Obviously, the openings are designed in a suitable manner for the pest whose presence is suspected and according to any performances associated with a specific shape or size.

It is understood here that the non-return system facilitates the passage of the insects from the capture zone to the trapping zone and slows down or prevents passage from the trapping zone to the capture zone. It can consist particularly of a membrane separating the medial and lower portions and having a funnel shape wherein the wide part is oriented towards the capture zone and the narrow part is oriented towards the trapping zone. The trapping zone can additionally comprise other means known to a person skilled in the art for retaining insects, for example an inner surface coated with an adhesive substance.

Advantageously, the device includes an on-board electronic module comprising at least one detection sensor configured to capture at least one item of representative information of an infestation risk in the trapping zone and generate at least one risk data item containing the at least one item of information.

It is understood here that the risk data item can correspond to an aggregation of the at least one item of information or to the result of a processing operation of the at least one item of information, in the aim of identifying pest proliferation factors.

Advantageously, the on-board electronic module comprises wireless transmission means configured to transmit the at least one risk data item to an offset electronic entity.

The offset electronic entity can correspond to a server or a database dedicated to monitoring the infestation risk associated with one or more devices, to a personal electronic entity such as a laptop computer or smart phone or to a relay communicating with such an offset electronic entity.

Thanks to the present invention, the infestation risk of a given environment by insect pests can be monitored remotely using in situ means.

In an advantageous embodiment of the invention, the electronic module comprises a control circuit of the at least one sensor configured to control the information capture according to a defined capture frequency.

In other words, the control circuit makes it possible to trigger the activation of the at least one sensor once per defined period, thus making it possible to keep the at least one sensor in a standby or equivalent state the rest of the time. This design makes it possible to limit the energy consumption of the device and increase the autonomy thereof.

Preferably, the capture frequency is substantially equal to one capture per day.

This frequency makes it possible to have sufficient monitoring while limiting the associated energy consumption as much as possible. It is also possible to have a minimum frequency of one capture every 7 days or a frequency outside periods of activity of one capture every 14 days in the winter to ensure minimum monitoring enabling prevention actions accounting for the seasonal nature of insect proliferation risks.

In a specific embodiment, the at least one risk data item contains:
- an item of representative information of a visual representation of the trapping zone; and/or
- an item of representative information of a presence of insects; and/or
- an item of representative information of a number of said insects; and/or
- an item of representative information of a filling rate of the trapping zone; and/or
- an item of representative information of an ambient temperature; and/or
- an item of representative information of an ambient humidity.

It is understood here that the at least one risk data item comprises one or more of these items of information in combination according to the number and type of sensors used as well as according to any processing of the item(s) of representative information enabling the generation of additional items of representative information.

In a specific embodiment, the at least one sensor comprises:
- a camera; and/or
- a thermal sensor; and/or
- a vibratory sensor; and/or
- a noise sensor; and/or
- a hygrometer.

It is understood here that, for example, the camera makes it possible to provide at least one item of representative information of a visual representation of the trapping volume, and that the thermal sensor makes it possible to provide at least one item of representative information of an ambient temperature.

A person skilled in the art will understand that the constituent elements of the at least one sensor can be selected according to the individual performances thereof or according to the respective synergies thereof to assess an infestation risk. For example, the camera makes it possible to determine the presence of insects in the trapping volume, which can be combined with a temperature measured by the thermal sensor to assess whether the environment is favourable for the breeding thereof.

In an additional embodiment, the at least one sensor is disposed in the trapping zone.

This design makes it possible to obtain direct information from inside the trapping zone while minimising the risk of interference from external elements to the trapping zone. For example, the camera obtains a clear view of the trapping zone. Obviously, other sensors not specifically requiring that information associated with the trapping zone be obtained can be disposed at any other suitable location of the device.

In a further embodiment that can be combined with the preceding embodiment, the non-return opening system comprises attachment means of the at least one sensor.

It is understood here that the sensor can be attached to a wall of the non-return system on the side of the trapping zone, which facilitates the assembly of the elements and limits the size of the trapping zone by the at least one sensor.

Preferably, the non-return valve has a funnel shape comprising a channel, the attachment means being disposed in the channel.

This design makes it possible for example to facilitate counting of the insects entering the trapping zone, by detecting a disturbance associated with the passage of an insect, for example a vibration or a light intensity variation.

In an additional embodiment, the body comprises in the upper portion a storage zone configured to house at least one electronic component of the electronic module from the following:
- the transmission means; and/or
- the control circuit; and/or
- a battery type electrical power supply.

It is understood that the storage zone makes it possible to embed an item of electronic equipment in the device without impeding the trapping of the insects. Obviously, it is also possible to design further positioning variants of the storage zone according to the sought overall shape of the device and the criteria associated with the capture, trapping and storage zones.

The presence of an on-board battery makes it possible to ensure device autonomy over a certain period according to the energy consumption thereof, without any constraint in respect of energy network or external conditions.

Preferably, the storage zone comprises at least one positioning pin configured for receiving and positioning the at least one electronic component.

This design makes it possible to facilitate the assembly of the device by precisely pre-dimensioning each pin and associated electronic component. The at least one positioning pin makes it possible additionally to attach the at least one electronic component in a stable manner to secure the handling of the device and increase the service life thereof.

The positioning pin can also be replaced by at least one fin and/or rib in the storage zone according to the design of the device and fulfilling an identical function.

In an additional implementation, the capture zone and the storage zone are separated from one another by a partition preventing the passage of the insects to the storage zone.

It is understood here that the storage zone is isolated from the external environment and from the rest of the device in order to prevent an infiltration of insects liable to damage the at least one electronic component.

In an additional implementation wherein the at least one sensor is arranged in the trapping zone, the medial portion of the body comprises at least one guide designed for the passage of at least one cable providing the electronic link between the at least one sensor and the other components of the on-board electronic module.

It is understood here that the at least one cable makes it possible to supply an electrical power supply to the at least one sensor, as well as transmission of information in both directions, for example an activation command from the control circuit to a sensor and a signal from the sensor in the opposite direction.

It is understood additionally that the position of the at least one cable in the body is previously defined by the position in the body of the at least one associated sensor, the other components of the electronic module and any openings in the partition and/or the non-return system for the passage of the at least one cable.

The guide corresponds for example to one or more lateral chutes arranged in the body of the device or to ad hoc attachment means arranged on the inner surface of the hollow body or held at the centre of the hollow body.

In a specific implementation, the body is produced by moulding or by machining.

A person skilled in the art understands here that manufacture by moulding, for example plastic injection moulding, makes it possible to produce a hollow body or a hollow part of a body to be assembled with a reduced cost on large production runs, whereas manufacture by machining makes it possible to produce parts of more complex shapes to obtain specific functionalities, for example using profiled tubes. The body can be produced of several parts capable of being assembled and making it possible to house elements such as the electronic module, for example by producing two complementary half-shells.

In a specific implementation, the at least one sensor is camera type and is configured to capture at least one image of the trapping zone and wherein the trapping zone is made of a material having a low light reflection coefficient preventing the presence of glare on the camera lens.

It is understood here that the inner surface of the trapping zone is designed so as to improve the quality of the image received by the camera. The material of the surface, or optionally of a coating on this surface, is thus chosen so as to minimise the glare on the camera lens, particularly if this camera is equipped with LED type diodes configured to turn on during a shot.

The background of the trapping zone can also be designed so as to improve the quality of the visual representation, particularly by having a shape enabling the spread of the insects. The background can also have a light or transparent colour, preferably white, making it possible to optimise the visual contrast with the insects.

In a further implementation, the lower portion of the body has a plurality of graduations along the length thereof.

This design makes it possible to facilitate the image processing operations described hereinafter, for example to better assess the filling rate of the trapping zone or estimate the number of insects trapped.

In a further implementation, the lower portion of the body has a narrow and long shape facilitating the measurement of a filling rate of the trapping volume.

This design also makes it possible to facilitate the estimation of a filling rate of the trap, while retaining a simple shape not requiring an additional manufacturing step.

A second aspect of the present invention relates to a system for monitoring infestation risk in a cereal storage environment, which comprises at least one trap device according to the first aspect of the invention integrated in the storage environment, an offset electronic entity configured to collect at least one risk data item generated by the at least one device and transmit the at least one risk data item collected to a remote server.

The at least one device is for example introduced into a cereal stock such that the capture zone and the trapping zone are entirely buried in the cereals and that the storage zone is at least partially exposed to the outside to facilitate the sending of the at least one risk data item by the transmission means without interferences due to the environment.

It is understood here that the offset electronic entity serves as a relay between the at least one device and the remote server. The offset electronic entity is for example integrated in or in the vicinity of the cereal storage environment and is connected directly to an electrical network so as to facilitate the communication by the at least one device without constraining the transmission of the at least one risk data item to the remote server.

The offset electronic entity can additionally include internal storage means, for example for grouping a plurality of risk data items over time before transmission to the remote server.

As described above, the remote server can correspond to a server or a database for monitoring infestation risk in at least one storage environment making it possible to group the risk data of at least one device over time, provide access to the risk data via an application and/or perform additional processing operations using the risk data.

The at least one device, the offset electronic entity and the remote server can communicate according to a wireless communication mode, for example according to a radio communication technology. The offset electronic entity creates for example a local wireless communication network whereon the at least one device is capable of transmitting information.

Preferably, the at least one sensor is camera type and is configured to capture at least one image of the trapping zone and the electronic module comprises image processing means using an image processing algorithm configured to:
  detect the presence of the insects; and/or
  identify at least one species associated with the insects; and/or
  counting the insects; and/or
  estimating a filling rate of the trapping zone.

It is understood here that the image processing means are selected according to energy consumption criteria so as to limit as much as possible the total energy needed for the at least one device to process and transmit the at least one risk data item.

Obviously, the remote server and/or the offset electronic entity can also use all or part of the image processing means according to the respective capacities of the at least one device, the offset electronic entity and the remote server.

The image processing algorithm can correspond to any means well-known to a person skilled in the art, for example a machine learning algorithm focusing on object recognition and performed by a neural network. Such an algorithm makes it possible to analyse complex images while progressively improving analysis speed and precision. The neural network can additionally be selected according to criteria associated with energy consumption or the quality of the processed image.

Thus, through the different functional and structural technical features above, the Applicant proposes an insect trap device for generating and transmitting at least one risk data item for remotely monitoring the infestation risk of a pest storage environment.

BRIEF DESCRIPTION OF THE FIGURES

The features of the present description will become apparent from the description hereinafter with reference to FIGS. 1 to 6 appended illustrating a plurality of embodiment examples which are devoid of any restrictive nature and wherein.

DETAILED DESCRIPTION

The present invention will now be described hereinafter with reference jointly to FIGS. 1 to 6 appended to the description.

As indicated in the preamble of the description, current insect trap solutions alone do not make it possible to prevent insect proliferation in a storage environment, and local steering of pest control operations is constrained by the personnel available and the location of the storage environment. One of the objectives of the present invention consists of collecting the relevant data for such steering on-site, while accounting for the lack of day-to-day accessibility of the traps.

This is enabled in the example described hereinafter.

It will be understood here that this example is not restrictive and the invention will find other applications for pest control in other environments, for example around vulnerable crops.

Figure 6:
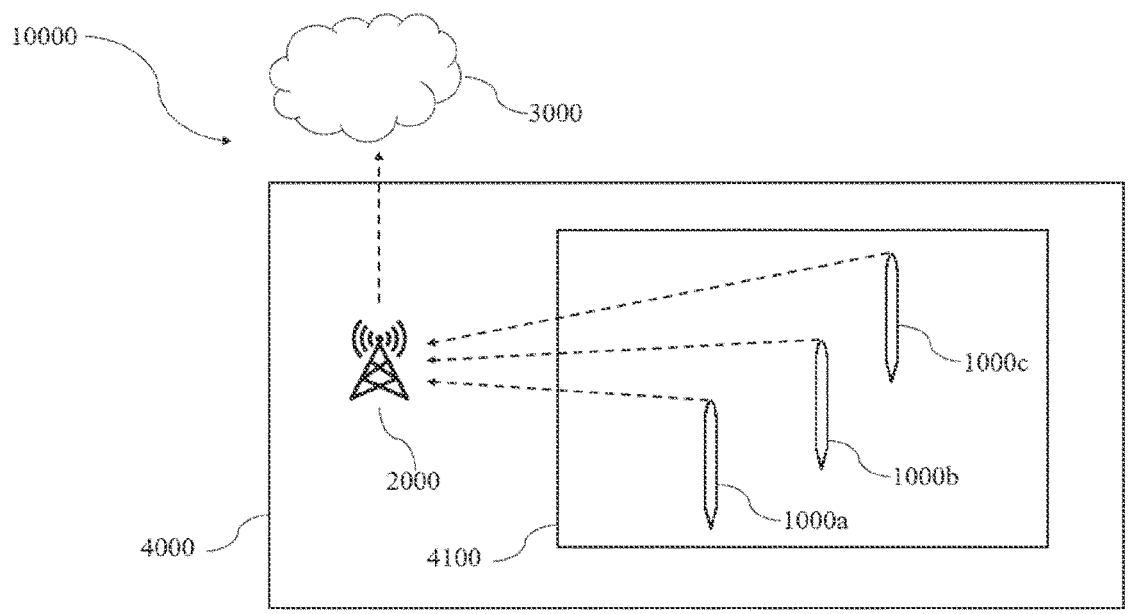
FIG. 6 represents a schematic view of a system for monitoring infestation risk including at least one device according to FIG. 1.

According to the example in FIG. 6, a plurality of devices 1000a, 1000b and 1000c developed within the scope of the present invention are introduced into a cereal stock 4100 of a storage environment 4000, for example a cereal stock 4100 vulnerable to weevil type insect infestation. The devices 1000a, 1000b and 1000c can be designed specifically to trap these insects and have a similar structure to the device 1000 as illustrated in FIG. 1.

This device 1000 includes a long hollow body 1100 extending along an axis X, for example a substantially vertical axis X, the body 1100 comprising a medial portion 1110, a lower portion 1120 and an upper portion 1130. This body 1100 is for example made of several complementary parts by a moulding operation, for example plastic injection moulding, by a machining operation or by a combination of such operations. Obviously, the production method will be essentially selected according to economic criteria linked with the size of the production runs and/or with the manufacturing constraints set by the design of the body 1100.

The medial portion 1110 has a plurality of openings 1112 capable of allowing insects to pass to the capture zone 1111 defined by the internal volume of the medial portion 1110. The openings 1112 have for example a shape and dimensions known by a person skilled in the art to facilitate the capture of weevils, for example a round shape of 2.5 mm in diameter, an oval shape of 4 mm by 2 mm or any other suitable shape.

Figure 1:
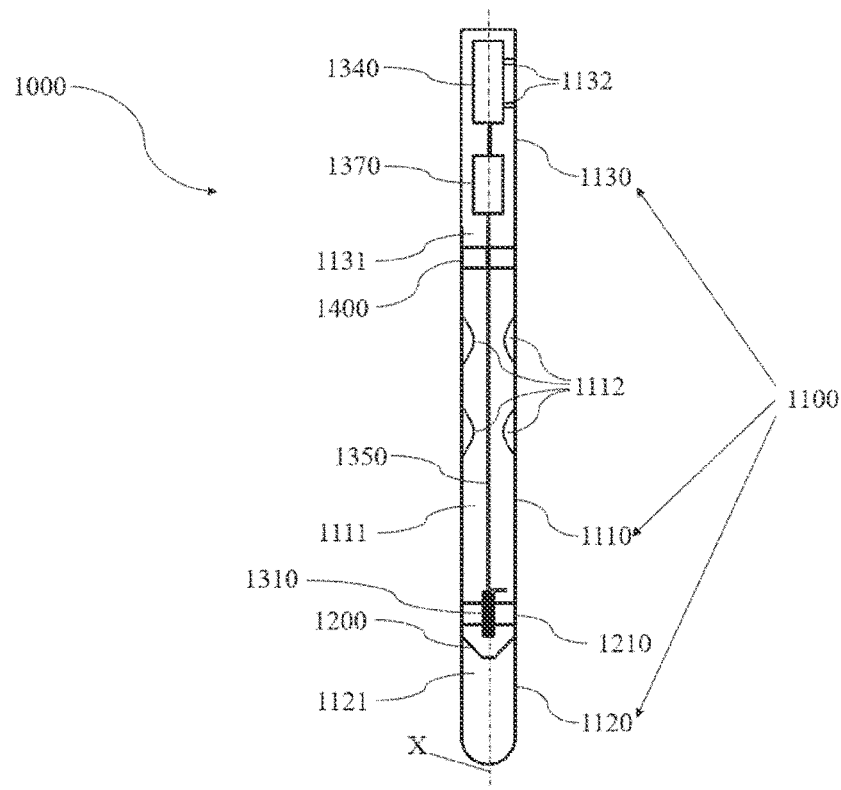
FIG. 1 represents a schematic sectional view of an insect trap device according to an embodiment example of the present invention.
Figure 2:
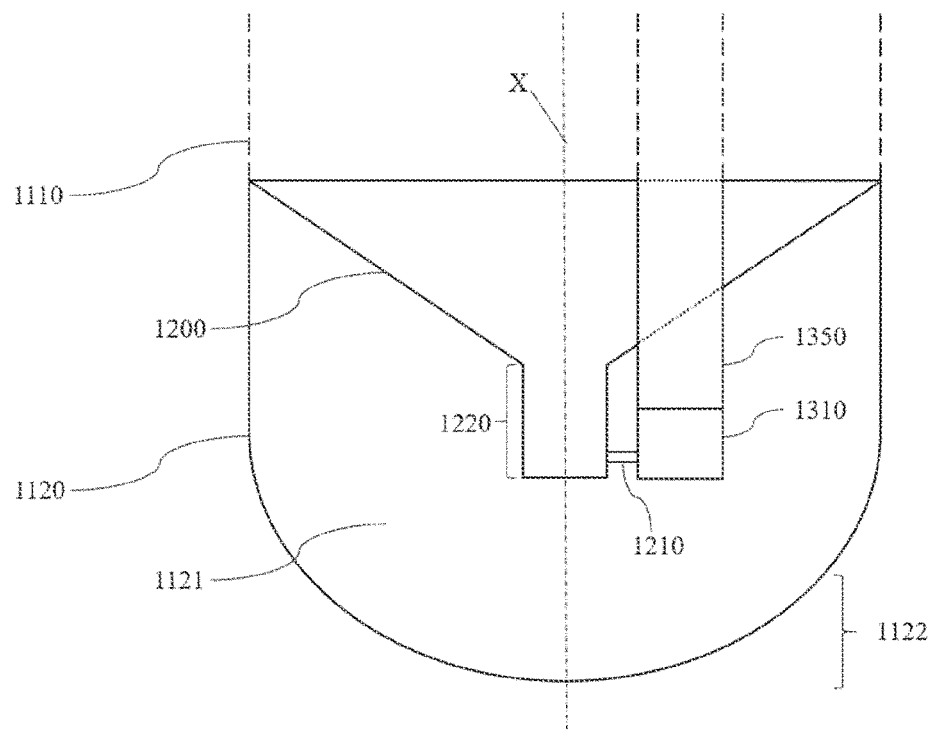
FIG. 2 represents a schematic sectional view of a lower portion of an insect trap device according to a second embodiment example of the invention.

As illustrated by FIGS. 1 and 2, this medial portion 1110 is connected to the lower portion 1120 by a non-return opening system 1200, which has for example a funnel shape comprising a channel 1220 (FIG. 2) oriented towards the lower portion 1120. This non-return opening system makes it possible to facilitate or free the passage of insects from the capture zone 1111 to a trapping zone 1121 defined by the internal volume of the lower portion 1120, while limiting or preventing the passage of insects in the other direction.

Optionally, the trapping of insects can be facilitated by a variety of means, for example by a vertical design of the body 1100 positioning the trapping zone 1121 under the capture zone 1111 and enabling gravitational trapping, by applying an anti-adherent substance on the internal walls of the medial portion 1110, by disposing baits, pheromones or equivalents in the trapping zone 1121 and/or the capture zone 1111 or by a combination of these means.

It is understood here that the association of the capture zone 1111 with the trapping zone 1121 via the non-return opening system 1200 ensures the operation of the insect trap. It is obviously possible to envisage other designs of the body 1100 associating these three elements and making it possible to adapt the trapping functionality according to a variety of constraints without leaving the scope of the invention.

Figure 5:
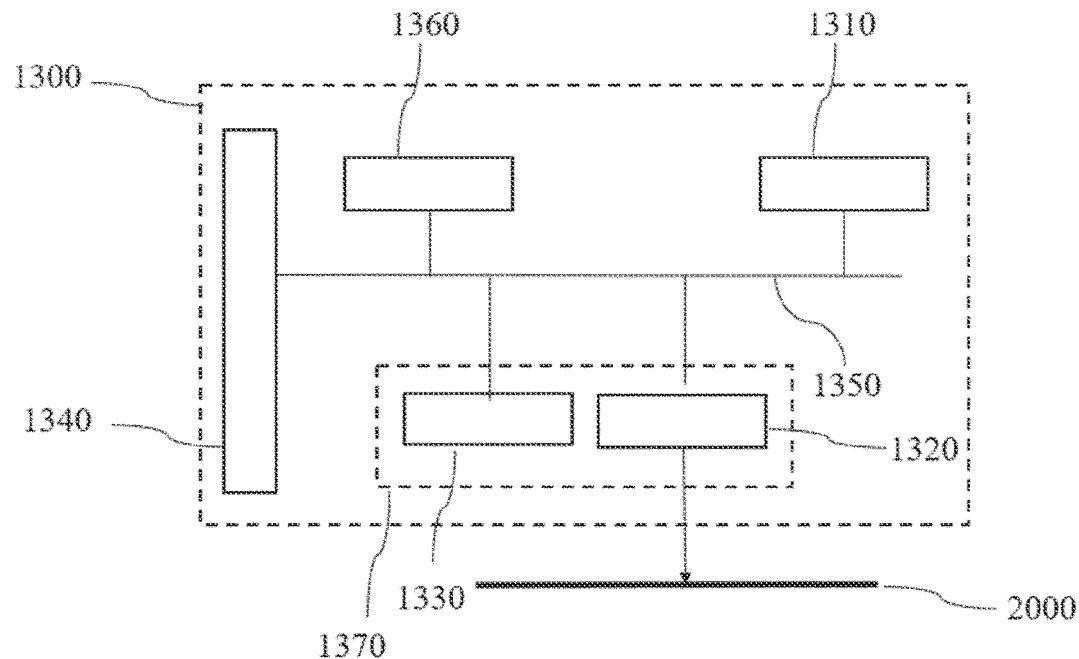
FIG. 5 represents an on-board electronic module included in a device according to FIG. 1.

In addition to the function of trapping insects of the cereal stock 4100, the device 1000 includes an electronic module 1300, for example the electronic module 1300 illustrated in FIG. 5 comprising a plurality of elements. The elements of the electronic module 1300, for example the elements 1310, 1320, 1330, 1340, 1350 and 1360, individually or combined, can be integrated in a single integrated circuit, in several integrated circuits, and/or in discrete electronic components.

Thus, the electronic module 1300 comprises at least one sensor 1310 configured to return an item of representative information of an infestation risk, for example a camera type sensor associated with a temperature sensor configured to return an item of representative information of a visual representation of the trapping zone 1121 and at least one item of representative information of an ambient temperature, for example the temperature of the trapping zone 1121 or the cereal stock 4100. This representative information can be grouped in the form at least one risk data item, which is returned by the at least one sensor 1310.

According to the example in FIGS. 1 and 2, the at least one sensor 1310 can be disposed directly in the trapping zone 1121. It is possible for example to design a camera type sensor 1310 oriented towards the background 1122 of the trapping zone 1121. In this example, the trapping zone 1121 can additionally be designed so as to optimise the quality of the image received by the camera, particularly by having an inner surface composed of a low-reflective material to limit the effects of light reflection on the camera lens, by designing a background 1122 facilitating the spread of the insects and/or having a white or transparent colour to improve the contrast with the insects, by graduating the trapping zone 1121 or by designing a trapping zone 1121 of particularly long shape to monitor the trapping of new insects over time.

As illustrated in FIG. 2, the non-return opening system can comprise attachment means 1210 of the at least one sensor 1310. Obviously, the attachment means 1210 are disposed according to the sought positioning and orientation of the at least one sensor 1310. According to a further design, the attachment means 1210 can be disposed in the channel 1220 of the non-return opening system 1200, for example to centre the at least one sensor 1310 in the trapping zone 1121 or to orient it in the channel 1220 such that the passage of an insect activates the at least one sensor 1310 for an insect count.

The electronic module 1300 additionally comprises wireless transmission means 1320 configured to transfer the at least one risk data item to an offset electronic entity 2000. As illustrated by FIG. 6, the offset electronic entity 2000 can be a fixed relay integrated in the storage environment 4000 configured to collect the risk data from the devices 1000a, 1000b and 1000c and transfer it to a remote server 3000 inside an infestation risk monitoring system 10000. The wireless communication between the devices 1000*a*, 1000*b* and 1000*c*, the offset electronic entity 2000 and the remote server 3000 uses for example a communication mode based on a radio communication technology such as Bluetooth®, LTE (Long-Term Evolution) or LTE-Advanced, preferably along a private communication channel and the wireless transmission means 1320 include for example a radiofrequency interface RF of the respective type.

Obviously, the wireless communication of the devices 1000*a*, 1000*b* and 1000*c* to the offset electronic entity 2000 and the wireless communication of the offset electronic entity 2000 to the remote server 3000 can use different technologies adapted to local constraints. The offset electronic entity can for example create a local communication network for collecting data from the devices 1000*a*, 1000*b* and 1000*c* according to a short-range communication consuming limited energy, and communicate with the remote server 3000 according to a more restricted long-range communication mode.

According to the monitoring system 10000 illustrated in FIG. 6, the remote server 3000 then makes it possible to group the risk data associated with a plurality of devices 1000*a*, 1000*b* and 1000*c* associated with a storage environment 4000 and make it accessible for a user such as a supervisor or manager of the storage environment 4000, for example via a dedicated application, to enable remote monitoring of the infestation risk of the storage environment 4000 and for example steer the preventive and/or corrective actions stemming from this risk data. It is also possible to design a monitoring system 10000 comprising a remote server 3000 communicating with a plurality of relays 2000 respectively associated with a plurality of storage environments 4000 in the aim of centralising the risk data even further and enabling simultaneous steering of the plurality of storage environments 4000.

As illustrated in FIG. 5, the electronic module 1300 can comprise further elements fulfilling auxiliary functions to the at least one sensor 1310 and the transmission means 1320. In particular, the electronic module 1300 can comprise a control circuit 1330 configured to control the capture of information of the at least one sensor 1310, for example by an activation command of the at least one sensor 1310 according to a capture frequency. This capture frequency will be determined so as to save as much as possible on the energy consumption of the electronic module 1300 while supplying relatively frequent risk data to track the evolution of the cereal stock 4100 and enabling the timely implementation of preventive and/or corrective actions by the user. The capture frequency can for example be set to one capture every 7 days during periods of weevil activity and/or breeding and to one capture every 14 days outside these periods. In a safer design, the capture frequency can also be set to one capture per day. Obviously, the capture frequency can be variable in the context of a plurality of sensors 1310, for example one capture every two hours for a temperature sensor associated with one capture every day for a camera type sensor.

According to a specific design illustrated in FIG. 5, the transmission means 1320 and the control circuit 1330 can be included in an electronic board 1370, for example an electronic board comprising a processor, integrate memory, an input/output interface enabling communication with the other electronic components of the electronic module 1300 and various circuits known to a person skilled in the art, the integrated memory storing the computing code of the on-board software including the instructions to be loaded and executed by the processor, particularly the instructions for determining the capture frequency.

As illustrated in FIG. 1, the electronic board 1370 is for example disposed in a storage zone 1131 defined by the internal volume of the upper portion 1130. In a vertical design of the body 1100, this positioning makes it possible to introduce the device 1000 into the cereal stock 4100 such that the upper portion 1130 is at least partially exposed outside the cereals. The operation of the transmission means 1320 is then simplified.

Optionally the storage zone 1131 is connected to the capture zone 1111 and to the rest of the body 1100 by a partition 1400, which makes it possible to isolate the storage volume 1131 from the capture zone 1111 and prevent the introduction of insects capable of disrupting the operation of the electronic board 1370. Further electronic components can be positioned in the storage zone 1131, particularly a battery 1340 ensuring the autonomy of the electronic module 1300. This battery 1340 is designed so as to attain a predefined degree of autonomy according to the expected consumption of the electronic module 1300 and particularly the capture frequency, preferably an autonomy of one year.

The storage zone 1131 can additionally comprise positioning pins 1132 intended to receive the electronic components, for example the battery 1340 illustrated in FIG. 1. Such positioning pins make it possible to facilitate the assembly of the device by the user by indicating and securing the placement of the electronic components in the device 1000.

Figure 3:
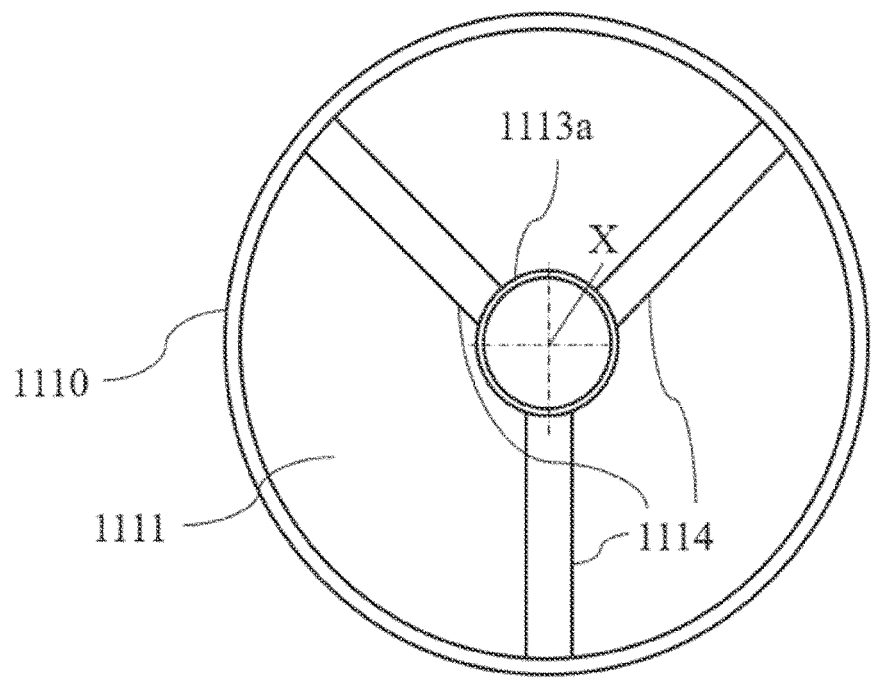
FIG. 3 represents a schematic front view of a guide designed for the passage of at least one cable included in a device according to FIG. 1.
Figure 4:
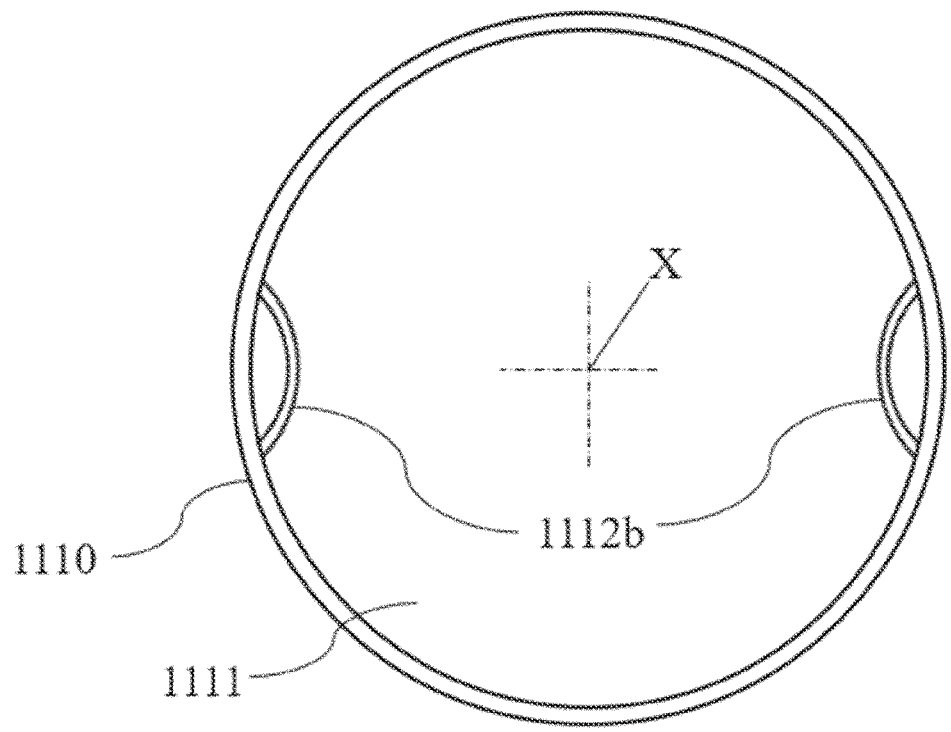
FIG. 4 represents a schematic front view of another guide designed for the passage of at least one cable included in a device according to FIG. 1.

In addition to the design of the electronic module 1300 based on several discrete electronic components, these components can be connected by at least one cable 1350 for transferring energy and information. The device 1000 can particularly be designed so as to allow the passage of a cable 1350 from the storage zone 1131 to the trapping zone 1121 by arranging openings in the partition 1400 and the non-return opening system 1200 designed to obstruct the passage of insects when the cable 1350 is positioned therein. The medial portion 1110 can additionally include at least one guide 1113*a*, 1112*b* as illustrated in FIGS. 3 and 4 enabling the passage of the cable 1350. This guide 1113*a*, 1112*b* can correspond to a central guide 1113*a* held in position by at least one arm 1114 (FIG. 3) for passing the cable 1350 at the centre of the capture zone 1111 without blocking the openings 1112 or to at least one lateral chute 1112*b* (FIG. 4) freeing the greatest possible volume of the capture zone 1111. It is also possible to design other means for guiding the cable 1350, particularly using attachment clips or hooks disposed on the inner wall of the medial portion 1110.

Finally, in the example of a camera type sensor 1310, the electronic module 1300 can comprise image processing means 1360 configured to process the representative information of a visual representation of the trapping zone 1121. These image processing means 1360 can be included in the electronic board 1370 or, as mentioned above, correspond to a discrete electronic component disposed in the storage zone 1131.

The image processing means 1360 implement at least one image processing algorithm known from the prior art, for example a CNN ("Convolutional Neural Network") type neural network or any other suitable type. This neural network may have undergone a step of learning from a library of "labelled" representative images of a trapping zone optionally comprising insects of species liable to be encountered or using raw data according to the means used, the examples available and the degree of precision attainable. The image processing algorithm, once trained, can return a plurality of representative values of an infestation risk, for example a representative value of a presence of insects, a representative value of a species associated with the insects, a representative value of a number of identified insects, a representative value of a filling rate of the trapping zone 1121, or any other representative value usable for estimating an infestation risk. The values returned by the image processing means can subsequently be included in the risk data item transmitted by the wireless transmission means 1320.

Obviously, according to the energy consumption associated with image processing and with risk data transmission or according to the available memory of the electronic module 1300, the offset electronic entity 2000 and/or the server 3000 use all of a part of the image processing means 1360 instead of the device 1000 such that the autonomy of the device 1000 is maximised. Additional processing operations stemming from the at least one risk data item and enabling monitoring of the infestation risk of the storage environment 4000 can also be envisaged without leaving the scope of the invention, for example a processing operation accounting for the activation of the at least one sensor 1310 and/or the detection of at least one insect, combined with an item of representative ambient temperature information and/or to the period of the year in question to estimate a risk indicator associated with the device 1000. The algorithm used to perform such a processing operation naturally varies according to the at least one risk data item, the specificities of the pest species in question and the final information to be delivered to the user.

Thus, it will be understood that the present invention provides an insect trap device for generating and transmitting at least one risk data item so as to remotely supply suitable information to a user such as a supervisor or manager of a storage environment comprising a cereal stock. The user can then perform remote monitoring of the health status of the cereal stock in order to facilitate the steering of pest control operations. This device can be included in a communication network on the scale of a storage environment comprising several devices communicating with a relay type offset electronic entity, or on the scale of several storage environments comprising a server communicating with the respectively associated offset electronic entities.

It should be observed that this detailed description relates to a specific embodiment example of the present invention, but that this description in no way applies any limiting nature to the subject matter of the invention; on the contrary, it is intended to remove any inaccuracy or any incorrect interpretation of the following claims.

It should also be observed that the reference signs placed between parentheses in the following claims are in no way limiting; these signs are merely intended to improve the intelligibility and comprehension of the following claims as well as the scope of the protection sought.

The invention claimed is:

1. An insect trap device in a cereal storage environment including a slender hollow body having:
    a medial portion including a plurality of openings opening into an internal volume of said medial portion defining a capture zone of said insects, and a guide held at a central axis within the body by at least one arm;
    a lower portion wherein the internal volume defines a trapping zone of said insects, said medial portion and said lower portion being connected by a non-return opening system,
    the insect trap device comprising an on-board electronic module comprising:
        a) at least one detection sensor disposed in the trapping zone, configured to capture at least one item of information representative of an infestation risk in said trapping zone and generate at least one risk data item containing said at least one item of information;
        b) wireless transmission means configured to transmit said at least one risk data item to an offset electronic entity; and
        c) at least one cable that runs through the guide, providing an electronic link between the at least one detection sensor and the other components of the on-board electronic module.

2. The insect trap device according to claim 1, wherein said electronic module further comprises a control circuit of said at least one sensor configured to control said information capture according to a defined capture frequency.

3. The insect trap device according to claim 2, wherein said capture frequency is substantially equal to one capture per day.

4. The insect trap device according to claim 1, wherein said at least one risk data item contains at least one selected from a group consisting of:
    an item of representative information of a visual representation of said trapping zone;
    an item of representative information of a presence of said insects;
    an item of representative information of a number of said insects;
    an item of representative information of a filling rate of said trapping zone;
    an item of representative information of an ambient temperature; and
    an item of representative information of an ambient humidity.

5. The insect trap device according to claim 1, wherein said at least one sensor comprises at least one selected from a group consisting of:
    a camera;
    a thermal sensor;
    a vibratory sensor;
    a noise sensor; and
    a hygrometer.

6. The insect trap device according to claim 1, wherein said at least one sensor is disposed in said trapping zone.

7. The insect trap device according to claim 1, wherein said non-return opening system comprises attachment means of said at least one sensor.

8. The insect trap device according to claim 7, wherein said non-return opening system has a funnel shape comprising a channel, said attachment means being disposed in said channel.

9. The insect trap device according to claim 1, wherein said hollow body comprises in the upper portion a storage zone configured to house at least one electronic component of said electronic module selected from the group consisting of:
    said transmission means;
    said control circuit; and
    a battery type electrical power supply.

10. The insect trap device according to claim 9, wherein said storage zone comprises at least one positioning pin configured for receiving and positioning said at least one electronic component.

11. The insect trap device according to claim 9, wherein said capture zone and said storage zone are separated from one another by a partition preventing the passage of said insects to said storage zone.

12. The insect trap device according to claim 1, wherein said body is produced by at least one of moulding or machining.

13. The insect trap device according to claim 1, wherein said at least one sensor is camera type and is configured to capture at least one image of the trapping zone and wherein said trapping zone is made of a material having a low light reflection coefficient preventing the presence of glare on the lens of said camera.

14. The insect trap device according to claim 1, wherein said lower portion of said hollow body has a plurality of graduations along the length thereof.

15. The insect trap device according to claim 1, wherein said lower portion of said hollow body has a narrow and long shape facilitating the measurement of a filling rate of said trapping zone.

16. A system for monitoring infestation risk in a cereal storage environment, comprising at least one trap device according to claim 1 integrated in said cereal storage environment, an offset electronic entity configured to collect at least one risk data item generated by said at least one trap device and transmit said at least one risk data item collected to a remote server.

17. The monitoring system according to claim 16, wherein said at least one sensor is camera type and is configured to capture at least one image of said trapping zone and wherein said electronic module comprises image processing means using an image processing algorithm configured to perform at least one selected from the group consisting of:
detect the presence of said insects;
identify at least one species associated with said insects;
count said insects; and
estimate a filling rate of said trapping zone.

18. The insect trap of claim 1, further comprising a plurality of radial arms that hold the guide in position within the body.

19. An insect trap device in a cereal storage environment including a slender hollow body having:
a medial portion including a plurality of openings opening into an internal volume of said medial portion defining a capture zone of said insects, and further including a guide held at a central position within the medial portion;
a lower portion wherein the internal volume defines a trapping zone of said insects, said medial portion and said lower portion being connected by a non-return opening system,
the insect trap device comprising an on-board electronic module comprising:
a) at least one detection sensor disposed in the trapping zone, configured to capture at least one item of information representative of an infestation risk in said trapping zone and generate at least one risk data item containing said at least one item of information;
b) wireless transmission means configured to transmit said at least one risk data item to an offset electronic entity; and
c) at least one cable that runs through the guide, providing an electronic link between the at least one detection sensor and the other components of the on-board electronic module.

* * * * *